United States Patent [19]

McGrew

[11] Patent Number: 4,832,424

[45] Date of Patent: May 23, 1989

[54] WHITE-LIGHT VIEWABLE, CYLINDRICAL HOLOGRAMS AND METHOD OF SPATIALLY FILTERING WAVEFRONTS

[76] Inventor: Stephen P. McGrew, 12615 Boulder St., Boulder Creek, Calif. 95006

[21] Appl. No.: 792,437

[22] Filed: Oct. 29, 1985

Related U.S. Application Data

[63] Continuation-in-part of Ser. No. 428,728, Sep. 30, 1982, abandoned.

[51] Int. Cl.⁴ .......................... G03H 1/24; G03H 1/28
[52] U.S. Cl. .................................. 350/3.65; 350/3.66; 350/3.69; 350/3.75
[58] Field of Search ................... 350/3.65, 3.66, 3.69, 350/3.75

[56] References Cited

U.S. PATENT DOCUMENTS

| | | |
|---|---|---|
| 2,492,738 | 12/1949 | Gabor . |
| 2,770,166 | 11/1956 | Gabor . |
| 2,805,599 | 9/1957 | Pajes . |
| 2,982,176 | 5/1961 | Kay . |
| 3,083,615 | 4/1963 | El-Sum . |
| 3,296,594 | 1/1967 | Van Heerden . |
| 3,412,493 | 11/1968 | French . |
| 3,506,327 | 4/1970 | Leith et al. . |
| 3,578,845 | 5/1971 | Brooks et al . |
| 3,580,655 | 5/1971 | Leith et al. . |
| 3,633,989 | 1/1972 | Benton .............................. 350/3.69 |
| 3,708,217 | 1/1973 | McMahon . |
| 3,758,186 | 9/1973 | Brumm . |
| 3,838,903 | 10/1974 | Leith et al . |
| 3,858,977 | 1/1975 | Baird et al. . |
| 3,894,787 | 7/1975 | Leith et al. . |
| 3,944,322 | 3/1976 | Benton . |
| 3,957,354 | 5/1976 | Knop . |
| 3,961,836 | 6/1976 | Knop . |
| 4,033,059 | 7/1977 | Hutton et al. . |
| 4,062,628 | 12/1977 | Gale . |
| 4,124,947 | 11/1978 | Kuhl et al. . |
| 4,155,627 | 5/1979 | Gale et al. . |
| 4,171,766 | 10/1979 | Ruell . |
| 4,186,943 | 2/1980 | Lee . |
| 4,304,809 | 12/1981 | Moraw .............................. 428/195 |
| 4,339,168 | 7/1982 | Haines ............................... 350/3.69 |

FOREIGN PATENT DOCUMENTS

| | | |
|---|---|---|
| 7376274 | 4/1976 | Australia . |
| 0012375 | 6/1980 | European Pat. Off. . |
| 0043509 | 1/1982 | European Pat. Off. . |
| 3035684AI | 5/1982 | Fed. Rep. of Germany . |
| 2345770 | 10/1977 | France . |
| 1384281 | 2/1975 | United Kingdom . |
| 1394021 | 5/1975 | United Kingdom . |
| 1517840 | 7/1978 | United Kingdom . |
| 2082505 | 3/1982 | United Kingdom . |

OTHER PUBLICATIONS

Galpern, A. D. et al., "Raster-Type Projection of 3D Images in Natural Light", Opt. Spectrosc. (USSR) 56(5), May 1984.

Iwata et al., "Characteristics of a Photoresist Hologram and its Replica", Appkied Optics, vol. 13, No. 6, pp. 1327–1336, (1974).

(List continued on next page.)

Primary Examiner—Bruce Y. Arnold
Attorney, Agent, or Firm—Seed and Berry

[57] ABSTRACT

A white-light viewable, cylindrical hologram is made by recording on a cylindrical recording medium the interference between a radial reference beam and an object wavefront emanating from the center of the cylindrical recording medium. In a second step, the cylindrical hologram is placed in a flat configuration and a second hologram is recorded by recording the interference between a reference beam and an object wavefront formed by directing coherent light through the first hologram. Finally, a third hologram is formed by recording the interference between a reference beam and an object wavefront formed by directing coherent light through a narrow strip of the second hologram. The third hologram is viewed by placing it in a cylindrical configuration and directing white light onto the hologram from a point source located on the axis of the cylindrical hologram.

9 Claims, 2 Drawing Sheets

OTHER PUBLICATIONS

Denisyuk, "On the Reproduction of the Optical Properties of an Object by the Wave Field of Its Scattered Radiation", [publication unknown], pp. 279–284 (1962).

Leith et al., "Reconstruction Wavefronts and Communication Theory", *Journal of the Optical Society of America*, vol. 52, No. 10, pp. 1123–1127 (1962).

Leith et al, "Wavefront Reconstruction with Continuous-Tone Objects", *Journal of the Optical Society of America*, vol. 53, No. 12, pp. 1377–1381 (1963).

Leith et al., "Wavefront Reconstruction with Diffuse Illumination and Three-Dimensional Objects", *Journal of the Optical Society of America*, vol. 54, No. 11, pp. 1295–1031 (1964).

Gabor, "A New Microscopic Principle", *Nature*, pp. 777–778 (1948).

Gabor, "Microscopy by Reconstruction Wave Fronts: II", *Proc. Phys. Soc.*, vol. 64, Part 6, pp. 449–469 (1951).

Gabor, "Microscopy by Reconstructed Wave-Fronts", [publication unknown], pp. 454–487 (1949).

Benton et al., "One-Step White-Light Transmission Holography", *SPIE*, vol. 212, Optics and Photonics Applied to Three-Dimensional Imagery, pp. 2–7 (1979).

Benton et al., "One-Step White-Light Transmission Holography", *SPIE*, vol. 215, Recent Advance in Holography, pp. 156–161 (1980).

Tamura, "Multicolor Image from Superposition of Rainbow Holograms", *SPIE*, vol. 126, Clever Optics, pp. 59–66 (1977).

Tamura, "Pseudocolor Encoding of Holographic Images Using A Single Wavelength", *Applied Optics*, vol. 17, No. 16, pp. 2532–2536 (1978).

Dobrowolski, "Optical Interference Coatings for Inhibiting of Counterfeiting", *Optics ACTA*, vol. 20, No. 12, pp. 925–937 (1973).

Denisyuk, "On the Reproduction of the Optical Properties of an Object by the Wave Field of Its Scattered Radiation. II", [publication unknown], pp. 152–157 (1963).

Hutley, Correspondence from National Physical Laboratory to Abraham of See 3 (Holograms) Ltd. (1984).

Collier et al., "Optical Holography", pp. 194–197, Academic Press (1971).

Okoshi, "Three-Dimensional Imaging Techniques", pp. 362–364, Academic Press (1976).

*Encyclopedia of Science and Technology*, vol. 4, pp. 151–152, McGraw-Hill (1971).

WHITE-LIGHT VIEWABLE, CYLINDRICAL HOLOGRAMS AND METHOD OF SPATIALLY FILTERING WAVEFRONTS

CROSS-REFERENCE TO RELATED APPLICATION

This is a continuation-in-part of application Ser. No. 428,728, filed Sept. 30, 1982 now abandoned.

TECHNICAL FIELD

The invention relates to holography, spatial filtering of wavefronts, and in particular, the white-light viewable holograms in flat or cylindrical configurations.

BACKGROUND ART

Cylindrical holograms viewable in monochromatic light are described by Dr. Tung Jeong. Dr. Jeong describes a single-step process wherein an object is placed inside a cylinder of holographic film and both object and film are illuminated simultaneously by a laser beam diverging from a point on the axis of the cylinder. Light scattering from the object interferes with the light directly illuminating the film and produces an interference pattern on the film. The exposed film is developed to yield a hologram of the object, viewable by rolling the film into a cylinder and illuminating it with monochromatic light from a point on the axis corresponding to the point from which the reference beam diverged. The important disadvantage of Dr. Jeong's process is that the hologram requires an expensive monochromatic illuminating source, such as filtered mercury arc lamp or a laser.

Another prior art cylindrical hologram is the "Cross" hologram, such as is described in U.S. Pat. No. 4,206,956. The Cross hologram is synthesized from a large number of two-dimensional images and is analogous to a lenticular photograph. While the Cross hologram is viewable in white light, it must be manufactured by a complex process requiring precision equipment, and it requires production of a motion picture film under special conditions.

Also in the prior art is a hologram covered by U.S. Pat. No. 3,633,989, by Dr. Steven Benton. Dr. Benton's patent primarily covers a means of producing an information-limited hologram of a subject for the purpose of making a white-light viewable image. The method white-light viewable holograms, but will not work for making cylindrical holograms, without cumbersome optical systems for forming and reconstructing holograms in a cylindrical symmetrical arrangement. The method calls for forming a real image of the subject of the hologram and limiting the vertical parallax of the light forming the real image.

Several workers in the field have attempted to copy cylindrical holograms by flattening an original cylindrical hologram, then reconstructing to form a second hologram on a plane parallel to the plane of the flattened original, but at a distance away. An example of such attempts is described in U.S. Pat. No. 4,339,168. One purpose of the attempts was to create a second hologram which formed a cylinder of smaller diameter, but which contained an image of the original size; another purpose was to create a second hologram whose image intersected the plane of the film.

These attempts did not simply work poorly. They failed utterly because flattening the cylinder rearranges the wavefront in such a way that the image is severely distorted and has no well-defined location. Haines' two-step method is inherently incapable of compensating for the distortions caused by changing the shapes of the holograms.

Prior to the present invention, there was no known method for creating a white-light viewable hologram other than multiplexed holograms of cylindrical "Cross" type, described in U.S. Pat. No. 4,206,956 by Stephen P. McGrew.

Prior art relating to spatial filtration of wavefronts is well represented by the teaching of Dr. Steve Benton (U.S. Pat. No. 3,633,989). Benton describes a method for producing white-light viewable holograms wherein a first hologram is constructed at a certain location (which we will call the "viewing location"); then a second hologram is formed at the real image position from the real image reconstructed when a long horizontal strip of the first hologram is illuminated by the conjugate to its reference beam.

In Benton's method, restricting the reconstructed portion of the first hologram to a horizontal strip is a form of spatial filtering. Once the first hologram has been made, there is no choice of viewing location.

The cylindrical Cross hologram and T. Jeong's cylindrical laser-viewable hologram are prior art cylindrical holograms. The Cross hologram is made in a series of steps including production of a cinema film. Jeong's hologram is made in a single step and is not white-light viewable.

DISCLOSURE OF THE INVENTION

An object of the invention is to provide a white-light viewable, cylindrical hologram of high resolution, free of distortion.

Another object of the invention is to provide a spatial filtration method applicable to cylindrical and planar holograms, allowing removal or suppression of unwanted portions of the recorded wavefront.

Another object of the invention is to provide a method for constructing distortion-free, white-light viewable holograms without the use of a converging reference beam.

These and other objects of the invention are provided by a three-step process in which a first hologram is produced, a second hologram is made from the first in a selected "filtration plane," and finally, a third hologram is made from the second hologram by reconstructing the second hologram with a reconstruction beam conjugate to its reference beam and recording the third hologram in the original location of the first hologram using a reference beam conjugate to the beam used to reconstruct the first hologram. The beam used to reconstruct the first hologram is typically not conjugate to the reference beam used to record the first hologram, except for the removal or suppression of selected features, such as vertical parallax 41. The useful consequences of such spatial filtering may include white-light viewability, removal of unwanted image features, enhancement of selected image features, or restriction of parallax or viewing angle.

BEST MODE FOR CARRYING OUT THE INVENTION

Figure 1:
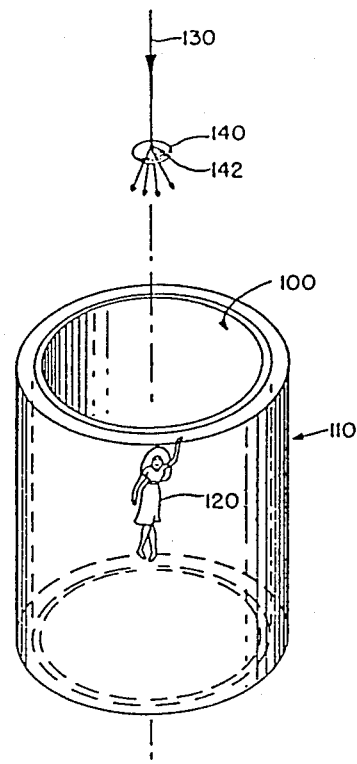
FIG. 1 is an isometric view showing a typical arrangement for making a monochromatic cylindrical hologram.

In a first step, a first cylindrical hologram is constructed by any of the methods available in the art of holography. The cylindrical hologram may be made, as shown in FIG. 1, with a laser beam diverging from a point 142 on the axis of a cylindrical film 100 positioned on the inside of a rigid cylinder 110 surrounding an object 120. The laser beam illuminates the object 120 as well as the film 110, thereby forming both an object wavefront and a reference beam whose interference is recorded on the film 110.

Figure 2:
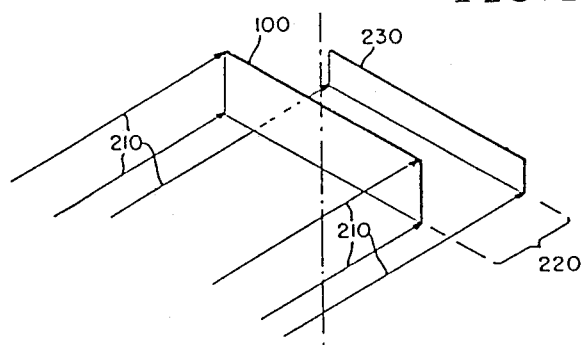
FIG. 2 is a schematic showing a typical arrangement for making an intermediate hologram from an original cylindrical hologram.

In a second step, a second hologram is made from the first hologram. As shown in FIG. 2, the first hologram 100 is held flat and reconstructed with a collimated beam 210. The reconstruction at this stage appears badly distorted, partly because the first hologram 100 has changed shape and partly because the reconstruction beam 210 is not conjugate to the reference beam 142 used to make the first hologram 100. For example, in the original scene, the front and back of object 120 (FIG. 1) are viewed along a common axis 180° apart from each other, i.e., in opposite directions. In the reconstruction of FIG. 2, the front and back of the object are viewed along two substantially parallel, spaced-apart axes, i.e., the front of the object 120 is viewed at one side of the flat sheet of film 100 and the back of the object 120 is viewed from the same direction at the other side of the film 100. Although the above-described distortion initially appears to be undesirable, it results in advantageous properties, as described in greater detail below.

Figure 3:
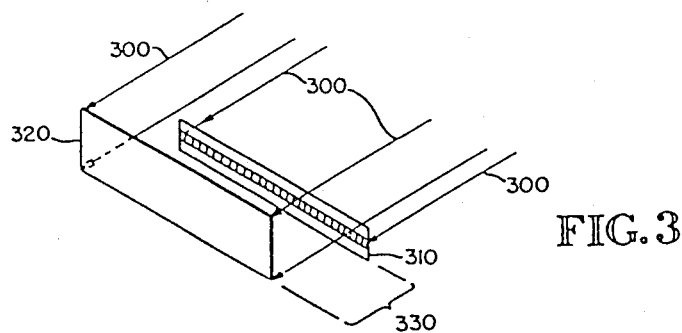
FIG. 3 is an isometric view showing a typical arrangement for making a white-light viewable, cylindrical hologram from an intermediate hologram.

In a third step, a third hologram 320 is made as shown in FIG. 3. The second hologram is reconstructed with a beam 300 conjugate to the reference beam 210 used to form the second hologram 230. The reconstruction of the second hologram forms an object wavefront that interferes with the beam 300. This interference is recorded to form the third hologram 320. The third hologram 320 is formed in the original flattened position of the first hologram 100 relative to the second hologram 230 using a reference beam 300 conjugate to the beam 210 used to reconstruct the first hologram.

Even though the second hologram 310 records a severely distorted version of the image in the first hologram 100, the third hologram 320 has no distortion because the object and reference beams forming the third hologram 320 have a geometry exactly conjugate to the beams in the reconstruction of the first hologram 100. That is, the third hologram 320 is identical to the first hologram 100 with respect to the rays recorded in the third hologram 320.

Therefore, when the third hologram 320 is rolled into the cylindrical shape in which the first hologram 100 was formed, it can be reconstructed without distortion. To make the third hologram 320 white-light viewable, only a thin horizontal strip of the second hologram is reconstructed, as indicated in FIG. 3. This amounts to spatial filtration of the information recorded in the first hologram.

It is important that the distance 220 in FIG. 2 and the distance 330 in FIG. 3 be a predetermined value and substantially equal to each other. The final hologram 320, for best results, should generate a focused spectrum at an appropriate viewing distance.

Figure 4:
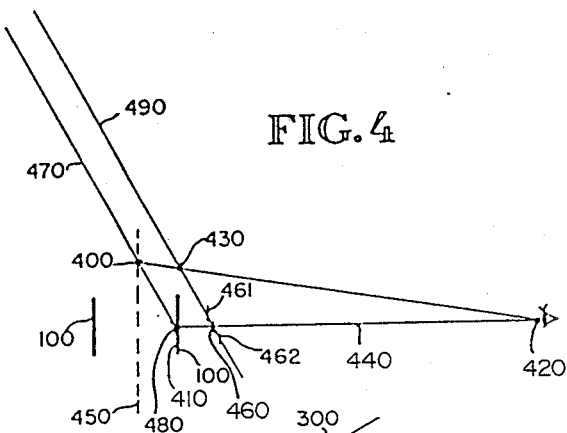
FIG. 4 is a schematic illustrating a method of calculating the correct position of the intermediate hologram relative to the original hologram if the original hologram is reconstructed using a collimated beam.
Figure 5:
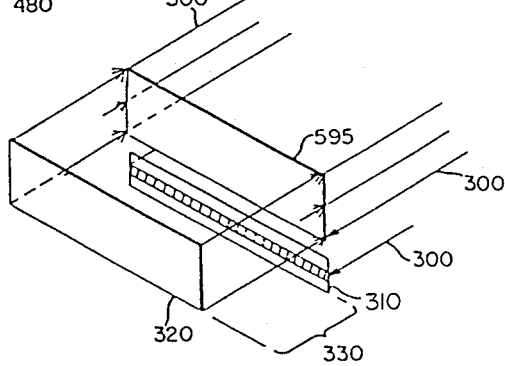
FIG. 5 is an isometric view showing the arrangement for making an achromatic final hologram by interposing a one-way diffuser in the reference beam.

The correct distance for viewing the final hologram 320 may be calculated graphically as shown in FIG. 4. FIG. 4 is a diagram representing a cutaway view of the original cylindrical hologram 100 in a normal viewing configuration, with a point monochromatic light source located at 400, on the axis 450 of the hologram 100. The normal position of an observer viewing the hologram is at 420. If a line is drawn from 400 to 420, the point 430 where that line intersects the extended surface of the hologram may be called the "hinge point." It is assumed, only for ease of explanation, that the color of the point source at 400 is the same as the color of the laser to be used in making the final hologram and the intermediate hologram, and that the same color will be the color in which an observer will perceive the image of the final hologram when looking from the normal viewing position.

A line 470 is drawn from 400 to the middle 480 of the hologram 100. Another line 490 is drawn through the "hinge point" 430 parallel to the line 470, and yet another line 440 is drawn from 480 to 420. Line 490 intersects the line 440 at 460. The distance from point 480 to point 460 is the desired distance;. 220 of FIG. 2 and 330 of FIG. 3. The distance 220 or 330 is the focal length of the final hologram 320.

As mentioned above, the distortion during the second step results in an advantageous property. The distortion refocuses the vertical components of the rays which would enter the eyes of a viewer at a normal viewing distance 440 in FIG. 4 to a line through point 460 located a few inches away from the first hologram. This is illustrated in FIG. 2, in which the flattened first hologram 100 is reconstructed by collimated beam 210 and selected rays (which would converge to a circular line located at a large radius [440 in FIG. 4]from hologram 100 if the hologram were reconstructed by a point [400 in FIG. 4]source on the axis 450 of the cylinder of hologram 100) are brought to a line focus at the nearby plane of the holographic film 230 in FIG. 2. Because the selected rays are focused to a nearby line, a relatively short length of holographic film 230 can record the full horizontal parallax of the image in hologram 100. If the selected rays were not brought to a nearby focus, film 230 would need to be much longer, because the rays reconstructed from a point on the first hologram spread out in a roughly conical bundle, and it is necessary to record the full horizontal parallax of the image even from the ends of the first hologram in order to provide image continuity at the juncture of the ends of the final (third) hologram (320 in FIG. 3).

The spatial filtration procedure described above may be used to subtract all of the components of the interference pattern recorded in the standard cylindrical hologram corresponding to unwanted vertical perspectives, as described below.

At a particular distance determined by the graphical technique, the light corresponding to the desired perspective is localized in a long, thin, circular region of space which transforms to a long, thin, straight region when the hologram is flattened. An intermediate hologram is recorded at that position. When only that strip of the intermediate hologram is reconstructed to re-record the original hologram, the re-recorded hologram contains only the one perspective desired. The unwanted vertical perspectives are absent, and as a result, the final (re-recorded hologram) hologram is white-light viewable. The intermediate hologram, though a recording of a transformed and distorted version of the information in the original, allows elimination of the unwanted information. Re-recording the original hologram de-transforms the desired information, returning it to its original form, less the unwanted information.

The effect of using the recording procedures indicated in FIGS. 2 and 3 is to produce a final hologram that is identical to the original hologram with respect to a certain horizontal aperture. Above and below that aperture, however, the final hologram contains no information. It is the presence of that information that is missing in the final hologram that makes the original hologram unsuitable for viewing in white light. If the re-recording geometry is much different from that indicated here, severe spatial and chromatic distortions will appear in the image. It is important to choose a re-recording geometry that selects from the infinity of component interference patterns in the original hologram only those components that will focus light of a particular color to the position of the observer. It is also important to use a geometry that preserves the shape of the image. The geometry presented in FIGS. 2, 3 and 4 meets these requirements.

In practice, it is also important to select recording materials which will permit use of the described methods. This is because the original hologram 100 is reconstructed by a beam nonconjugate to the beam used to form the original hologram and because the final hologram 320 is ultimately illuminated by a beam of white light nonconjugate to the reference beam used to form it. A thick, angle-selective, original hologram may not be reconstructable as shown in FIG. 2, so appropriate recording materials are relatively thin. Kodak SO-173 film processed in D-19 developer and bleached in a 0.5% iodine/methanol The method of Dr. Benton's U.S. Pat. No. 3,633,989 will not produce cylindrical holograms without a cumbersome recording setup involving cylindrical optics and holograms reconstructed in a cylindrical configuration using a converging beam in order to form the threedimensional real image required in the method. The method of the present invention, by adding an extra step, circumvents the need for forming a real image of a subject. Whereas Dr. Benton's invention produces a hologram whose image is "proximate to" the hologram and is normally actually in the same plane as the hologram, the present invention cannot easily be used to make a hologram in which the image is in the same plane as the hologram. The present invention is a way to make an exact copy of selected features of a holographic interference pattern, as opposed to a method for producing an information-limited hologram of a subject.

An important feature of the above-described process is the fact that the information in the first hologram 100 is rearranged in the process of forming the second hologram 310. The configuration of the first hologram 100 and its reconstruction beam 210 are chosen so that the reconstructed information is rearranged in a convenient way. In this example, the purpose is to make a distortion-free, white-light viewable, cylindrical hologram. It is convenient, in order to rearrange the information from the first hologram 100, to position the selected "viewing rays" along a straight line parallel to and relatively close to the first hologram 100 so that the "viewing rays" can be recorded easily in a second hologram 310.

The term "approximately collimated beam," as used in the following claims herein, means a radiation beam that is really collimated but may have a relatively small degree of convergence, divergence, distortion or aberration such as might be caused by using a spherical mirror to approximate a parabolic mirror, using a tilted collimator, or using a holographic lens or Fresnel lens incorrectly as a collimator.

The forms of the invention disclosed herein constitute preferred embodiments of the invention. Many other forms and embodiments are possible, and it is not possible nor intended herein to illustrate all of the possible valent forms, variations, applications and ramifications of the invention. It will be understood that words used are words of description rather than limitation, and that various changes, such as changes in shape, relative size, orientation, arrangement of parts and steps, recording materials, recording geometries, and illumination methods may be made without departing from the spirit or scope of the invention herein disclosed.

I claim:

1. A method of making a third hologram from a first hologram, such first hologram made using a first reference beam, such that said third hologram retains only predetermined features of said first hologram, comprising:

reconstructing said first hologram with a first coherent reconstruction beam;

recording a second hologram at a predetermined position with respect to said first hologram by interfering the reconstruction of said first hologram with a second reference beam upon a holographic recording medium; and recording said third hologram at a position corresponding to the position of said first hologram relative to said second hologram by reconstructing a predetermined portion of said second hologram with a second reconstruction beam conjugate to said second reference beam and interfering the reconstruction of said second hologram with a third reference beam conjugate to said first coherent reconstruction beam upon a holographic recording medium.

2. A method of making a final hologram from a first hologram, said first hologram made using a first reference beam, such that said final hologram retains only predetermined features of said first hologram, comprising:

reconstructing said first hologram with a coherent reconstruction beam that causes the information in said predetermined features to pass through a predetermined window in space while causing the information in other features to bypass said aperture;

recording a second hologram upon a holographic recording medium positioned near said aperture, said second hologram: being recorded from the reconstruction of said first hologram and a second reference beam;

reconstructing with the conjugate of said second reference beam only the portion of said second hologram recorded within said aperture; and making said final hologram by recording the interference of the reconstruction of said second hologram with a third reference beam conjugate to said coherent reconstruction beam.

3. A method of making a white-light viewable, cylindrical hologram, comprising:

recording a first monochromatic cylindrical hologram;

reconstructing said first hologram said first hologram in a flat configuration with a coherent reconstruction beam, said coherent reconstruction beam being approximately collimated;

recording a second hologram of the reconstruction of said first hologram at a predetermined position relative to said first hologram using a first reference beam;

recording a third hologram of a predetermined elongated portion of said second hologram by reconstructing said second hologram with the conjugate of said first reference beam, with said third hologram being positioned in substantially the same position relative to said second hologram as said first hologram was positioned relative to said second hologram; and making said white-light viewable, cylindrical hologram by recording the interference of the reconstruction of said second hologram with a second reference beam.

4. A method of making a white-light viewable, cylindrical hologram, comprising:

recording a first monochromatic cylindrical hologram using a first reference beam;

reconstructing said first hologram in a flat configuration with a first coherent reconstructing beam;

recording a second hologram of the reconstruction of said first hologram at a predetermined position relative to said first hologram using a second reference beam;

reconstructing a predetermined elongated portion of said second hologram using the conjugate of said second reference beam; and making said white-light viewable, cylindrical hologram by recording the interference of the reconstruction of said second hologram with a third reference beam conjugate to said first coherent reconstruction beam, said white-light viewable, cylindrical hologram being recorded at substantially the same position relative to said second hologram as said first hologram was positioned relative to said second Hologram.

5. A cylindrical, white-light viewable hologram made by the method of claim 4.

6. A method of making a multicolor, white-like viewable, cylindrical hologram, comprising:

recording a plurality of cylindrical monochromatic holograms, each in a different color;

reconstructing with an approximately collimated beam each of said monochromatic holograms in a flat configuration at a predetermined position relative to said monochromatic holograms;

recording a second hologram from the reconstruction of each of said monochromatic holograms; and making said multicolor, white-light viewable, cylindrical hologram by recording a third hologram as a superposition of recordings of the reconstructions of a selected elongated portion of each of said second holograms, said recordings being performed in a recording geometry that preserves only the features of each of said monochromatic holograms which display a substantially undistorted image to an observer at predetermined viewing position in color corresponding to he color of each of said monochromatic holograms.

7. A cylindrical, white-light viewable hologram made by the method of claim 6.

8. A method of making a third hologram from a first hologram such that said third hologram retains only predetermined features of said first hologram, comprising:

selecting a coherent beam that causes the information in said predetermined features to pass through a pupil in space while causing the information in other features to bypass said pupil when said first hologram is in a predetermined shape;

using said coherent beam to reconstruct said first hologram in said predetermined shape;

recording a second hologram of the information passing through said pupil;

reconstructing said second hologram; and recording a third hologram of only the predetermined information from said second hologram passing through said pupil, said third hologram positioned relative to said second hologram in substantially the same way that said first hologram is positioned relative to said second hologram.

9. A process for making white-light viewable, cylindrical holograms, comprising:

placing a cylindrical sheet of holographic recording medium around an object;

illuminating said object with coherent radiation to form a first object wavefront emanating from said object toward said holographic recording medium;

directing a first reference beam of coherent light onto said recording medium to interfere with said first object wavefront, thereby forming a first hologram;

placing said first hologram in a planar configuration;

placing a second sheet of holographic recording material at a predetermined distance from said first hologram;

illuminating said first hologram with coherent radiation to form a second object wavefront emanating from said first hologram toward said second sheet of holographic recording material;

directing a second reference beam of coherent light onto said second sheet of recording medium to interfere with said second object wavefront at said second sheet of recording medium, thereby forming a second hologram;

placing a third sheet of holographic recording medium parallel with said second hologram at said predetermined distance from said second hologram;

illuminating a strip of said second hologram with coherent radiation to form a third object wavefront emanating from said strip of second hologram toward said third sheet of holographic recording material, the coherent radiation illuminating said second hologram being conjugate to said second reference beam;

directing a third reference beam of coherent radiation onto said third sheet of holographic recording material, said third reference beam being conjugate to the coherent radiation forming said first reference beam, thereby recording a third hologram; and placing said third hologram in a cylindrical configuration corresponding to the cylindrical configuration that said first sheet of holographic material was in when said first hologram was recorded so that said third hologram may be viewed with white light without significant geometric distortion.

* * * * *

UNITED STATES PATENT AND TRADEMARK OFFICE
CERTIFICATE OF CORRECTION

PATENT NO. : 4,832,424

DATED : May 23, 1989

INVENTOR(S) : Stephen P. McGrew

It is certified that error appears in the above-identified patent and that said Letters Patent is hereby corrected as shown below:

In claim 2, column 6, line 66, following "hologram" delete ":".

In claim 3, column 7, line 12, following "said first hologram" delete "said first hologram".

In claim 4, column 7, line 53, delete "Hologram" and substitute therefor --hologram--.

In claim 6, column 8, line 6, following "observer at" insert --a--.

In claim 6, column 8, line 7, delete "he" and substitute therefor --the--.

Signed and Sealed this

Sixth Day of March, 1990

Attest:

JEFFREY M. SAMUELS

*Attesting Officer*      *Acting Commissioner of Patents and Trademarks*